US008681620B2

(12) United States Patent
Park et al.

(10) Patent No.: US 8,681,620 B2
(45) Date of Patent: Mar. 25, 2014

(54) METHOD FOR NOTIFYING ABOUT/AVOIDING CONGESTION SITUATION OF DATA TRANSMISSION IN WIRELESS MESH NETWORK, AND MESH NODE FOR THE SAME

(75) Inventors: Sang Joon Park, Daejeon (KR); Yoo Seung Song, Daejeon (KR); Young Bae Ko, Gyeonggi-do (KR); Sung Hee Lee, Gyeonggi-do (KR); Keun Woo Lim, Gyeonggi-do (KR)

(73) Assignees: Electronics and Telecommunications Research Institute, Daejeon (KR); Ajou University Industry-Academic Cooperation Foundation, Suwon-Si (KR)

( * ) Notice: Subject to any disclaimer, the term of this patent is extended or adjusted under 35 U.S.C. 154(b) by 185 days.

(21) Appl. No.: 13/213,613

(22) Filed: Aug. 19, 2011

(65) Prior Publication Data
US 2012/0044806 A1    Feb. 23, 2012

(30) Foreign Application Priority Data

Aug. 20, 2010    (KR) .................. 10-2010-0080974

(51) Int. Cl.
*H04L 12/26*    (2006.01)
*H04J 1/16*    (2006.01)
*H04J 3/14*    (2006.01)

(52) U.S. Cl.
USPC .......................... 370/232; 370/231; 370/235

(58) Field of Classification Search
USPC .................. 370/229, 230–235, 400, 401
See application file for complete search history.

(56) References Cited

U.S. PATENT DOCUMENTS

| 8,311,049 | B2 * | 11/2012 | Roberts et al. ............... 370/412 |
| 2008/0056125 | A1 | 3/2008 | Kneckt et al. |
| 2010/0182907 | A1 * | 7/2010 | Pinter et al. .................. 370/235 |
| 2010/0214922 | A1 * | 8/2010 | Yeung et al. .................. 370/235 |

FOREIGN PATENT DOCUMENTS

| KR | 10-0812412 | 1/2002 |
| KR | 10-2009-0111990 | 10/2009 |
| KR | 10-2010-0057229 | 5/2010 |
| KR | 10-2010-0090362 | 8/2010 |

OTHER PUBLICATIONS

Camp et al., The IEEE 802.11s Extended Service Set Mesh Networking Standard, Communications Magazine, IEEE, vol. 46, Issue: 8, (Aug. 12, 2008).*
Hung Quoc Vo, et al., "Multi-path Routing Protocol Using Cross-Layer Congestion Awareness in Wireless Mesh Network," Proceedings of the 2$^{nd}$ International Conference on Ubiquitous information Management and Communication, p. 486, Jan. 2008.

* cited by examiner

*Primary Examiner* — Abdullah Riyami
*Assistant Examiner* — Brian Cox
(74) *Attorney, Agent, or Firm* — Staas & Halsey LLP

(57) ABSTRACT

Provided is a multi-route routing scheme that supports Quality of Service (QoS) in the wireless mesh network. A method of notifying about and avoiding congestion situation in data transmission in a wireless mesh network and a mesh node may also be provided. Data may be differentially transmitted to multiple routes by obtaining a route congestion level existing in a current multi-hop route and thus, data providing a real-time service, such as a video streaming service, may avoid congested routes and may be promptly transmitted. Multiple queues in a mesh node may be divided into divided queues based on a congestion situation of a transmission route in a network and the divided queues may be transmitted through multiple routes and thus, an efficiency of the overall network may increase.

16 Claims, 10 Drawing Sheets

RANN Flag Field Format

210

METHOD FOR NOTIFYING ABOUT/AVOIDING CONGESTION SITUATION OF DATA TRANSMISSION IN WIRELESS MESH NETWORK, AND MESH NODE FOR THE SAME

CROSS-REFERENCE TO RELATED APPLICATION

This application claims the benefit of Korean Patent Application No. 10-2010-0080974, filed on Aug. 20, 2010, in the Korean Intellectual Property Office, the disclosure of which is incorporated herein by reference.

BACKGROUND

1. Field of the Invention

The present invention relates to a multi-path routing scheme that supports quality of service (QoS) in a wireless mesh network, and more particularly, to a mesh node and a method of notifying about and avoiding congestion situation of data transmission in the wireless mesh network.

2. Description of the Related Art

A wireless mesh network may provide services, such as access to the Internet and the like, to multiple user terminals through multi-hop communication between mesh nodes wirelessly connected to each other. The wireless mesh network may transmit data using the multi-hop communication between the mesh nodes and thus, extension and maintenance of the network may be easy. Therefore, the wireless mesh network may be used as a backbone for various applications of a different communication network, such as a surveillance network, a community network, and the like.

Recently, many standard organizations have adopted a wireless mesh feature, and particularly, the Institute of Electrical and Electronics Engineers (IEEE) developed IEEE 802.11s to standardize the wireless mesh network based on a wireless local area network (LAN).

IEEE 802.11s defines the Hybrid Wireless Mesh Protocol (HWMP) for the multi-hop routing. The HWMP may simultaneously use an on-demand scheme based on an Ad hoc On-Demand Distance Vector (AODV) routing scheme and a proactive scheme that periodically manages a tree-shaped route when a route node is set. In this example, the route node may transmit a route announcement (RANN) message to the overall network to generate and manage a routing route. Depending on the type of data in the mesh network, the route node may maintain quality of service (QoS) in real time.

The current standard only defines a feature of the QoS of IEEE 802.11e that is based on single-hop networks, and does not define QoS in a multi-hop environment where multiple routes are used. Therefore, the QoS defined in IEEE 802.11s is inappropriate for the mesh network that is based on the multi-hop environment.

SUMMARY

An aspect of the present invention provides a method of notifying about and avoiding a congestion situation in data transmission and a mesh node that may insert a corresponding data congestion level of the mesh node to a Route Announcement (RANN) message of a gateway (GW) and may notify the data congestion level to other mesh nodes existing in the same route.

Another aspect of the present invention also provides a method of notifying about and avoiding a congestion situation in data transmission and a mesh node that may generate a RANN message including the data congestion level when the data congestion level is greater than a predetermined value, and may notify the data congestion level to other mesh nodes existing in the same route.

Another aspect of the present invention also provides a method of notifying about and avoiding a congestion situation in data transmission and a mesh node that may divide the queues to be used for data transmission into divided queues when a data congestion level of a different mesh node is notified, and may differentially transmit the divided queues to transmission routes based on the data congestion level.

According to an aspect of the present invention, there is provided a method of notifying about and avoiding a congestion situation in data transmission using a mesh node existing in a route between multiple gateways (GWs) in a wireless mesh network, the method including calculating a data congestion level based on a degree of data accumulated in a queue to be used for transmitting the data when a Route Announcement (RANN) message is received from the multiple GWs, comparing a route congestion level of the RANN message with the data congestion level, and setting the data congestion level as the route congestion level of the RANN message when the data congestion level is greater than the route congestion level, and transmitting the RANN message where the route congestion level is newly set, to the mesh node and a subsequent mesh node in the same route as the mesh node.

According to another aspect of the present invention, there is provided a method of notifying about and avoiding a congestion situation in data transmission using a mesh node existing in a route between multiple gateways (GWs) in a wireless mesh network, the method including calculating the data congestion level based on a degree of data accumulated in the queues to be used for transmitting the data, and including this information in an RANN message based on whether the calculated data congestion level is greater than or equal to a predetermined value, setting the calculated data congestion level as a route congestion level of the RANN message, and transmitting the RANN message where the calculated data congestion level is set as the route congestion level, to the mesh node and a subsequent mesh node in the same route as the mesh node.

According to another aspect of the present invention, there is provided a mesh node existing in a route between multiple gateways (GWs) in a wireless mesh network, the mesh node including a message receiving unit to receive an RANN message from the multiple GWs, a calculator to calculate the data congestion level based on a degree of data accumulated in a queue to be used for transmitting the data, and comparing the route congestion level of the RANN message with the data congestion level, newly setting the data congestion level as the route congestion level of the RANN message when the data congestion level is greater than the route congestion level, and transmitting the RANN message where the data congestion level is newly set as the route congestion level, to a mesh node in a subsequent route.

According to another aspect of the present invention, there is provided a mesh node existing in a route between multiple GWs in a wireless mesh network, the mesh node including a calculator to calculate the data congestion level based on the degree of data accumulated in the queues to be used for transmitting the data, a congestion determining unit to determine whether the calculated data congestion level is greater than or equal to a predetermined value, and a message transmitting unit to generate an RANN message for which the data congestion level is set as the route congestion level when the data congestion level is greater than or equal to the predetermined value, and to transmit the generated RANN message to a subsequent mesh node in the same route as the mesh node.

Additional aspects, features, and/or advantages of the invention will be set forth in part in the description which follows and, in part, will be apparent from the description, or may be learned by practice of the invention.

Effect

According to example embodiments, data may be promptly and reliably transmitted based on priority, characteristics, and transmission congestion situation of data. The priority and the characteristics of the data may be determined based on multiple queues.

According to example embodiments, data may be differentially transmitted to multiple routes by obtaining the route congestion level existing in the current multi-hop route and thus, data providing real-time service, such as a video streaming service, may avoid a congested route and may be promptly transmitted.

According to example embodiments, the queues may be divided into divided queues based on a congestion situation of a transmission route in a network and the divided queues may be transmitted through multiple routes and thus, efficiency of the overall network may increase.

According to example embodiments, a mesh node may periodically obtain degree of the congestion situation in a network in advance and thus, may avoid data delay that may occur in a route to the primary GW. When the data congestion level is greater than or equal to a predetermined value, the mesh node may notify other mesh nodes of the data congestion level through an on-demand congestion situation notice method and thus, may reduce data collision and transmission load of the data.

Accordingly, example embodiments may support QoS of data transmission in a multi-hop environment and thus, data transmission rate and reliability of data transmission may be enhanced.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
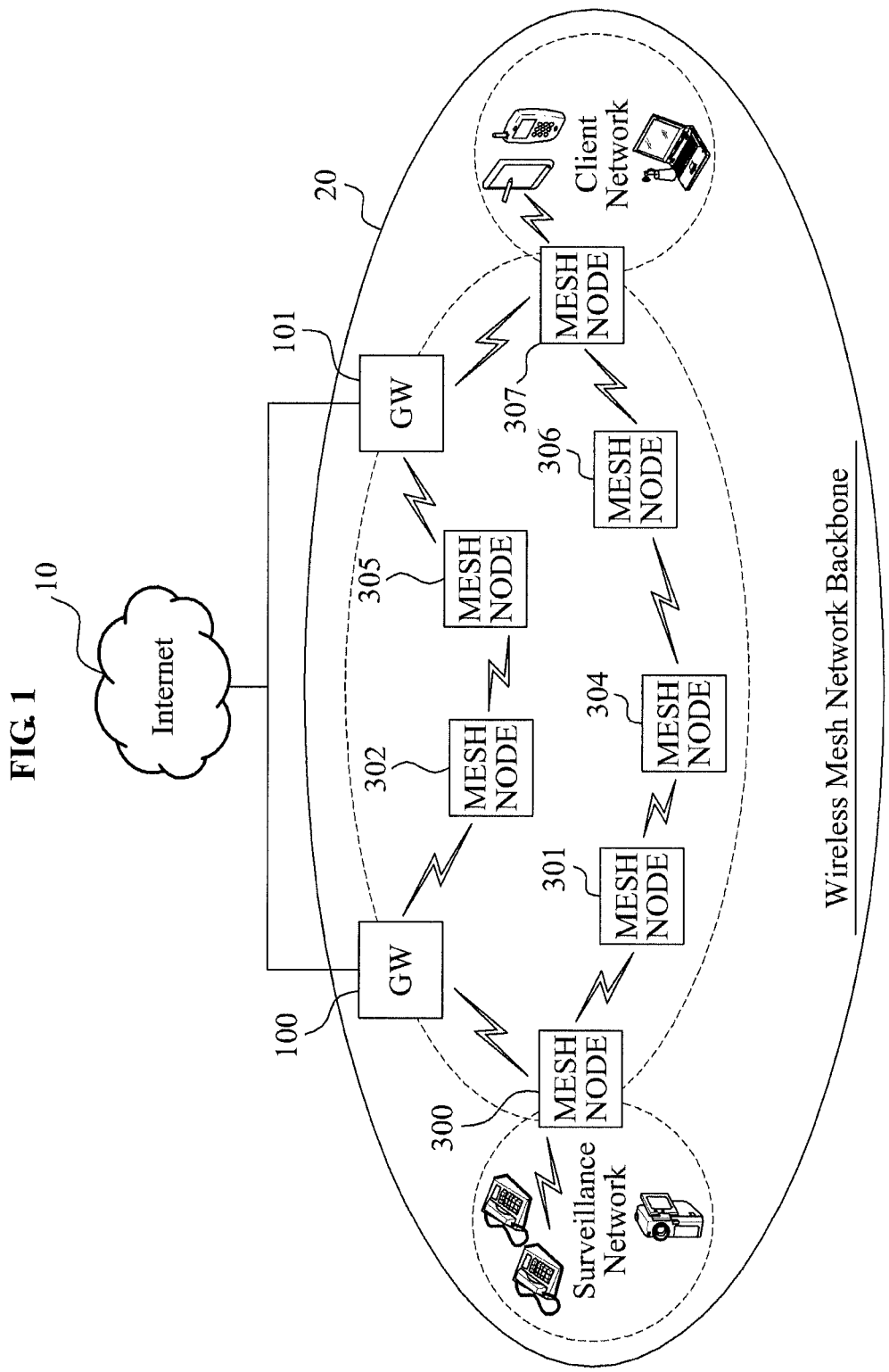
FIG. 1 is a diagram illustrating a wireless mesh network environment where a method of notifying about and avoiding congestion situation in data transmission is applicable according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a wireless mesh network environment where a method of notifying about and avoiding congestion situation in data transmission is applicable according to an embodiment of the present invention.

Referring to FIG. 1, a wireless mesh network 20 may include multiple gateways (GWs) such as a GW 100 and a GW 101, and multiple mesh nodes 300 to 307, and may interoperate with an external network, for example, the Internet 10, though the GW 100 and the GW 101.

The wireless mesh network 20 may be utilized as a backbone for various applications and thus, various data may be transmitted and received over the wireless mesh network. In this example, priorities may be assigned to the various data based on the transmission time and the transmission rate, and each of the multiple mesh nodes 300 to 307 may promptly process data having high priority based on the priorities corresponding to the various data or multiple queues.

The wireless mesh network 20 may include the multiple GWs 100 and 101 wired to the external network, and the multiple mesh nodes 300 to 307 may configure routes for data transmission to the GW 100 and the GW 101. Multiple routes respectively corresponding to the GW 100 and the GW 101 may exist and thus, multiple routes exist through which the multiple mesh nodes 300 to 307 may respectively transmit data to the external network.

In this example, the multiple mesh nodes 300 to 307 may use multiple queues based on characteristics of data, to guarantee quality of service (QoS) of data transmission. For example, mesh node 300 among the multiple mesh nodes 300 to 307 may calculate the data congestion level based on the degree of data accumulated in each of the multiple queues, and may transmit the calculated data congestion level to other mesh nodes in the same route and thus, remaining mesh nodes 301 to 307 among the multiple mesh nodes 300 to 307 may recognize a data congestion situation in advance and may handle the data congestion situation. The multiple mesh nodes 300 to 307 (the remaining mesh nodes 301 to 307) may determine the data congestion situation of respective routes based on the transmitted data congestion level, and may transmit a part of or all data via different routes to avoid transmission delay in the route where the congestion situation occurs.

In this example, the data congestion level may be included in an RANN message which is periodically generated by a GW, such as, the GW 100 and GW 101, and may be transmitted to the remaining mesh nodes 301 to 307, which is referred to as a method of previously notifying about a congestion situation (a previous congestion situation notice method?). Also, when a data congestion level is calculated to be greater than or equal to a predetermined value, the mesh node 300 may generate an RANN message including the data congestion level and may transmit the generated RANN message to the remaining mesh nodes 301 to 307, which is referred to as an on-demand congestion situation notice method.

Figure 2A:
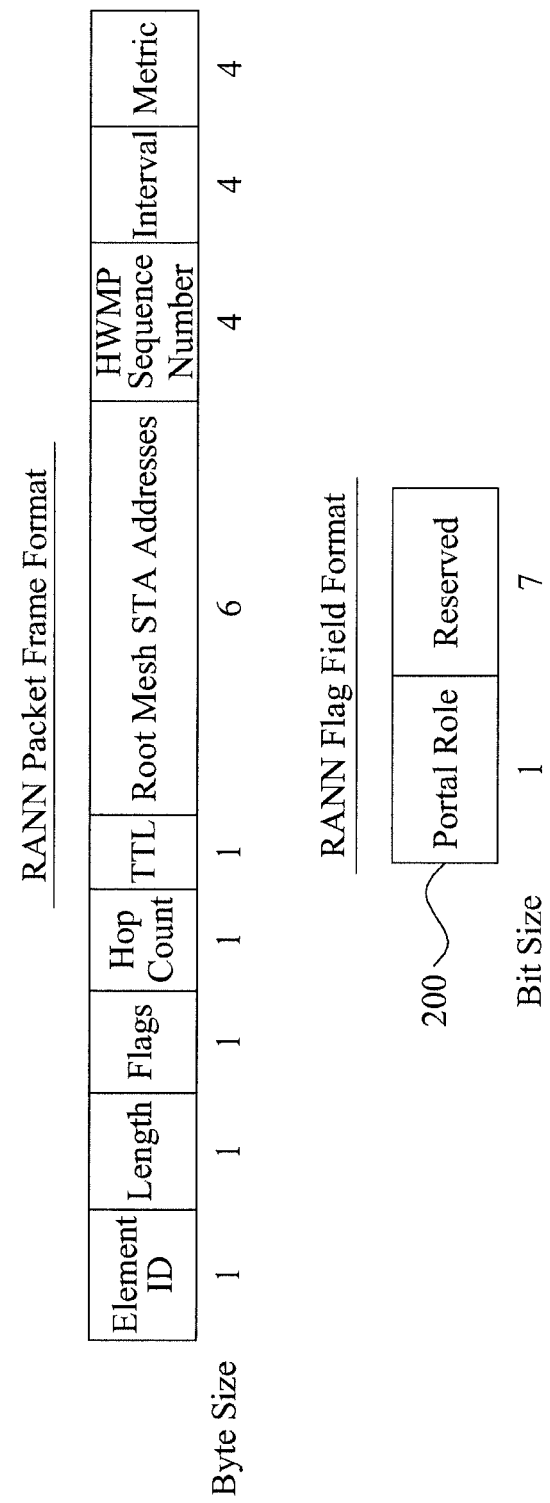
FIGS. 2A, 2B, and 2C are diagrams illustrating the configuration of a route announcement (RANN) message used in a method of notifying about and avoiding congestion situation in data transmission according to an embodiment of the present invention.
Figure 2B:
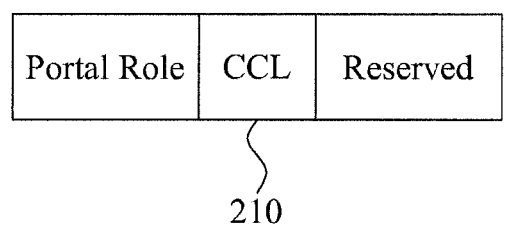
Figure 2C:
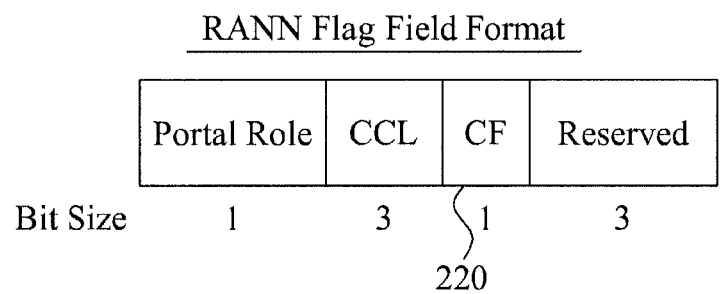

FIGS. 2A, 2B, and 2C illustrate the configuration of the RANN message of FIG. 1. Referring to FIG. 2A, the RANN message is configured as defined in IEEE 802.11s, and may include an RANN packet frame format including multiple fields, such as an Element ID field, a Length field, a Flags field, a Hop Count field, a TTL field, a Root Mesh STA Addresses field, a HWMP Sequence Number field, an Interval field, and a Metric field. The RANN flag field format includes multiple flag fields, such as a Portal Role field and a Reserved field.

Therefore, the mesh node 300 may set, in the RANN flag field 200, a route congestion level with respect to a route of the mesh node 300 using a data congestion level of the mesh node 300.

Referring to FIG. 2B, the RANN message may further include a predetermined field, for example, a Current Congestion Level (CCL) field 210 in the RANN flag field format, and the mesh node 300 may set the data congestion level as the route congestion level in the CCL field 210.

When a data congestion that is greater than or equal to a predetermined value occurs, a mesh node may generate the RANN message based on the on-demand congestion situation notice method. Referring to FIG. 2C, the RANN message may further include a predetermined field, for example, a Congestion Flag (CF) field 220 in the RANN flag field format, and the CF field 220 may indicate whether the on-demand congestion situation notice method is performed.

Figure 3:
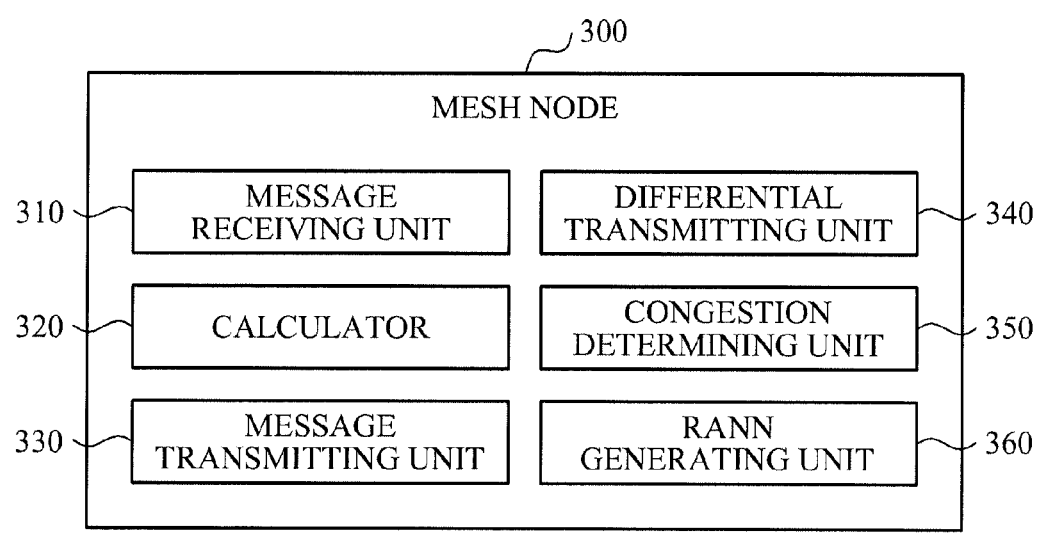
FIG. 3 is a diagram illustrating a mesh node that performs a method of notifying about and avoiding congestion situation in data transmission according to an embodiment of the present invention.

FIG. 3 illustrates the mesh node 300 that performs a method of notifying about and avoiding a congestion situation in data transmission according to an embodiment of the present invention.

Referring to FIG. 3, the mesh node 300 may include multiple queues (not illustrated) for data transmission, and may include a message receiving unit 310, a calculator 320, a message transmitting unit 330, and a differential transmitting unit 340 for the method of notifying about and avoiding the congestion situation.

The message receiving unit 310 may receive an RANN message generated by the GW 100 and the GW 101.

The calculator 320 may calculate the data congestion level CCL based on the degree of data accumulated in the multiple queues of a mesh node. When an RANN message is received by the message receiving unit 310 or data transmission begins, the calculator 320 may calculate the data congestion level CCL.

When processing of a queue having a high priority is further delayed, the calculator 320 may determine the data congestion level CCL to be higher based on priority information and the degree of data accumulated in each of the multiple queues.

The data congestion level CCL may be calculated as expressed by Equation 1.

$$CCL = \sum_{i=1}^{n}(Q_i \times w_i) \quad \text{[Equation 1]}$$

In Equation 1, $Q_i$ may denote a value indicating a degree of data accumulated in an $i^{th}$ queue, $w_i$ may denote a priority of the $i^{th}$ queue, and n may denote a number of the multiple queues. When data is accumulated in a queue having a high priority, a weight may increase in Equation 1, compared with a case where data is accumulated to a queue having a low priority. Therefore, as data is accumulated in the queue having the high priority, the data congestion level CCL may be determined to be higher.

The data congestion level CCL may be set as a level indicating a range of a value. A degree of the congestion situation may be classified into a level 1 through a level 5, based on the data congestion level CCL calculated based on Equation 1. In this example, the level 1 may indicate that the degree of the congestion situation is light, and the level 2 through the level 5 may indicate a more congested situation.

The calculator 320 may compare the calculated data congestion level CCL with a route congestion level set in the RANN message, and may newly set the data congestion level CCL as the route congestion level of the RANN message when the data congestion level is greater than the route congestion level.

The message transmitting unit 330 may transmit, to a mesh node of a subsequent route, the RANN message, the route congestion level of which may or may not be newly set by the comparison of the calculator 320.

Similarly, the mesh node of the subsequent route may receive the RANN message, may calculate a data congestion level with respect to its queue, may perform a setting process in the RANN message, and may transmit the RANN message. The transmitting of the RANN message will be described with reference to FIG. 4.

Figure 4:
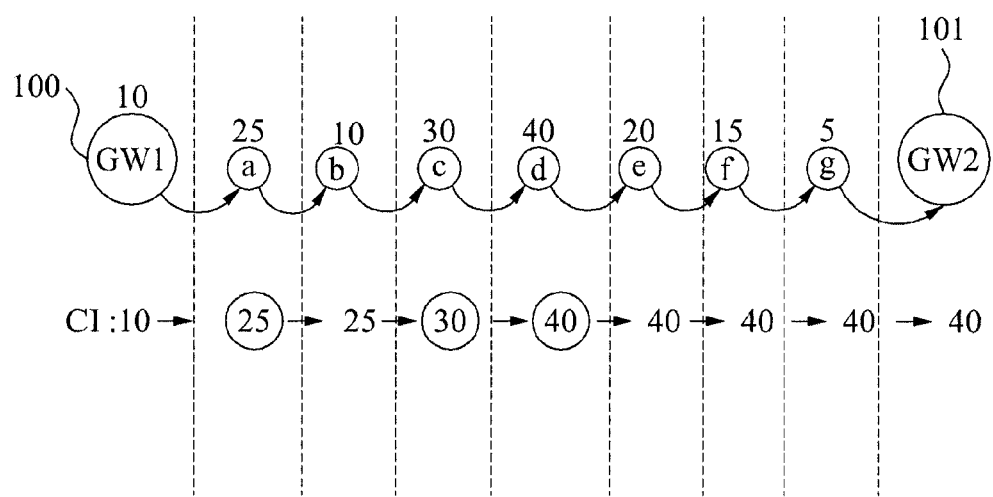
FIG. 4 is a diagram illustrating a method of prior notification about congestion situation for notifying about and avoiding congestion situation in data transmission according to an embodiment of the present invention.

FIG. 4 illustrates a process of transmitting an RANN message based on the method of proactively notifying about a congestion situation.

Referring to FIG. 4, the GW 100 may generate an RANN message having a route congestion level of 10, and may transmit the generated RANN message to a mesh node a. The mesh node a may calculate a data congestion level of 25 with respect to a corresponding queue of the mesh node a, and may determine whether the calculated data congestion level of 25 is greater than the route congestion level of 10 of the received RANN message. The data congestion level of 25 of the mesh node a is greater than the route congestion of 10 of the RANN message. Therefore, the mesh node a may newly set the data congestion of 25 as the route congestion level of the RANN message and may transmit, to a subsequent mesh node b, the RANN message in which the route congestion level is newly set. Similarly, the mesh node b may calculate a data congestion level of 10 with respect to a corresponding queue of the mesh node b. However, the calculated data congestion level of 10 is less than a route congestion level of 25 of the current RANN message and thus, the mesh node b may transmit, to a mesh node c, the current RANN message having the route congestion level of 25.

Subsequently, a mesh node c through a mesh node g may calculate their data congestion levels with respect to corresponding queues, as 30, 40, 20, 15, and 5, respectively, and may compare their data congestion levels with a route congestion level of a current RANN message. When the data congestion level is greater than the route congestion level, each of the mesh node c through the mesh node g may transmit, to a corresponding subsequent mesh node, an RANN message having the data congestion level as the route congestion. The greatest data congestion level from among proactively transmitted data congestion levels of previous mesh nodes may insert, in real time as the route congestion level, to the RANN message transmitted from the GW 100 to the GW 101 and may be transmitted. Therefore, each of the mesh node a through the mesh node g in the same route may recognize the degree of the congestion situation in the route from the GW 100 to immediately prior to a corresponding mesh node.

When data transmission with respect to a queue is requested, a differential transmitting unit may divide the multiple queues and may differentially transmit the divided queues to transmission routes determined based on the congestion level of the RANN message. In other words, the differential transmitting unit may transmit, at different ratios, the divided queues to corresponding transmission routes.

When the divided queues are transmitted, the differential transmitting unit 340 may set a GW, for example, the GW 100, existing in an optimal route from among the multiple GWs, as a primary GW and may set a GW, for example, the GW 101, as a secondary GW. The differential transmitting unit 340 may differentially transmit the divided queues to a transmission route of the primary GW and a transmission route of the secondary GW, using a route congestion level corresponding to the optimal route.

However, several mesh nodes in the same route may receive the same route congestion level and thus, the divided queues may be differentially transmitted at the same ratio from the differential transmitting unit.

To prevent the differential transmission at the same ratio, the differential transmitting unit 340 may determine a differential transmission level of the divided queues based on airtime link cost information associated with each of the primary GW and the secondary GW and the route congestion level, and may transmit, based on the determined differential transmission level, each of the divided queues to the transmission route of the primary GW and the transmission route of the secondary GW.

As the differential transmission level increases, the differential transmitting unit may increasingly transmit divided queues to the secondary GW. The differential transmitting unit may calculate the differential transmission level as expressed by Equation 2.

$$RL = CCL \times \left(1 + \frac{2 \times \text{airtime\_link\_cost}_{pri}}{\text{airtime\_link\_cost}_{pri} + \text{airtime\_link\_cost}_{alter}}\right) \quad \text{[Equation 2]}$$

In Equation 2, airtime_link_cost$_{pri}$ may denote airtime link cost information associated with a route to the primary GW, airtime_link_cost$_{alter}$ may denote air time link cost information associated with a route to the secondary GW, and CCL may denote a route congestion level set in the RANN message. A minimal value of airtime_link_cost$_{alter}$ may be the same as airtime_link_cost$_{pri}$ and thus, the maximal value of the differential transmission level may be double the route congestion level and the minimal value of the differential transmission level may be the same as the route congestion level.

As the difference between the cost value of the primary GW and the cost value of the secondary GW becomes lower, efficiency in using the secondary GW may further increase. As the difference between the cost value of the primary GW and the cost value of the secondary GW is high, the cost for data transmission to the secondary GW may increase and thus, the efficiency in using the secondary GW may be lower. Therefore, a node having a small cost difference with the primary GW may be used as the secondary GW.

The differential transmitting unit may differentially transmit the divided queues to the primary GW and the secondary GW, based on the differential transmission level. The differential transmitting unit 340 may classify the differential transmission level into different levels, that is, level 1, level 2, level 3, level 4, and level 5, may adjust a number of the divided queues for each level, and may transmit each of the queues to the primary GW and the secondary GW. The levels may be set as ranges based on the minimal value and the maximal value of the differential transmission level.

Figure 5:
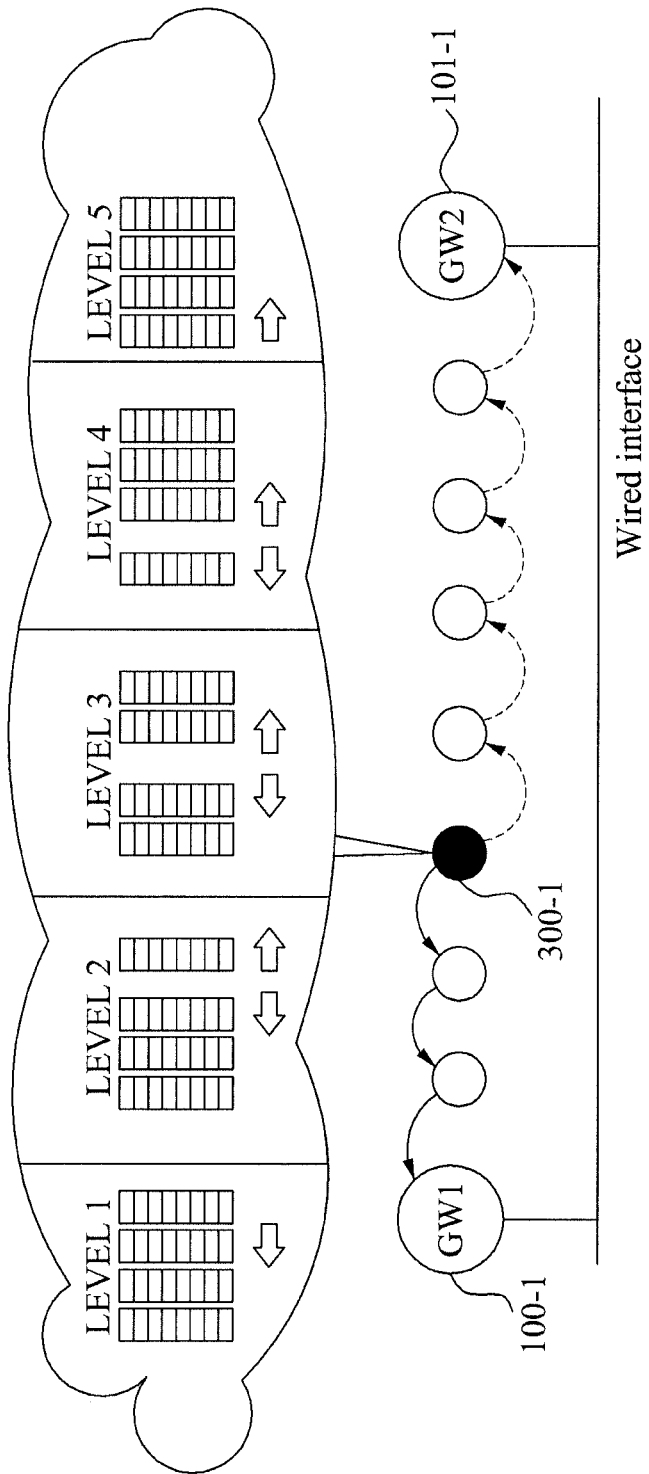
FIG. 5 is a diagram illustrating a method of differentially transmitting data for notifying about and avoiding congestion situation in data transmission according to an embodiment of the present invention.

FIG. 5 illustrates a method of differentially transmitting data in the method of notifying about and avoiding congestion situation in data transmission according to an embodiment of the present invention.

Referring to FIG. 5, the differential transmitting unit 340 may differentially transmit divided queues. In this example, the differential transmission level may be classified into different levels, that is, level 1 indicating no congestion, level 2 indicating weak congestion, level 3 indicating medium congestion, level 4 indicating high congestion, and level 5 indicating full congestion.

Therefore, mesh node 300-1 may calculate the differential transmission level of the mesh node 300-1, may determine the level corresponding to the calculated differential transmission level, and may differentially transmit the divided queues to the primary GW 100-1 and the secondary GW 101-1.

When the calculated differential transmission level corresponds to level 1, the mesh node 300-1 may transmit all the divide queues to the primary GW 100-1, and when the calculated differential transmission level corresponds to level 2, the mesh node 300-1 may differentially transmit the divide queues to the primary GW 100-1 and the secondary GW 101-1, that is, may transmit one divided queue to the secondary GW 101-1 and may transmit remaining divided queues to the primary GW 100-1. When the calculated differential transmission level corresponds to level 3, the mesh node 300-1 may transmit two divided queues to the secondary GW 101-1 and may transmit remaining queues to the primary GW 100-1. As the calculated differential transmission level is high, the mesh node 300-1 may increase a number of queues to be transmitted to the secondary GW 101-1.

Referring to FIG. 3, The mesh node 300 may determine the data congestion level of the queues, may generate an RANN message based on the determined data congestion level, and may transmit the generated RANN message to a subsequent mesh node, for example, node 301, in the same route as the mesh node 300. The mesh node 301 may recognize that the data congestion level of the queues of the mesh node 301 is at a significantly high, and may enable the subsequent mesh node 301 to avoid the route, which is referred to as the on-demand congestion situation notice method.

The mesh node 300 may further include congestion determining unit 350 and the RANN generating unit 360.

When the data congestion level is calculated by the calculator 320, the congestion determining unit 350 may determine whether the calculated data congestion level is greater than or equal to a predetermined value.

When the data congestion level is greater than or equal to the predetermined level, the RANN generating unit 360 may generate an RANN message having the data congestion level as a route congestion level, and may transmit the generated RANN message to the message transmitting unit 330.

The on-demand congestion situation notice method may be described with reference to FIG. 6.

Figure 6:
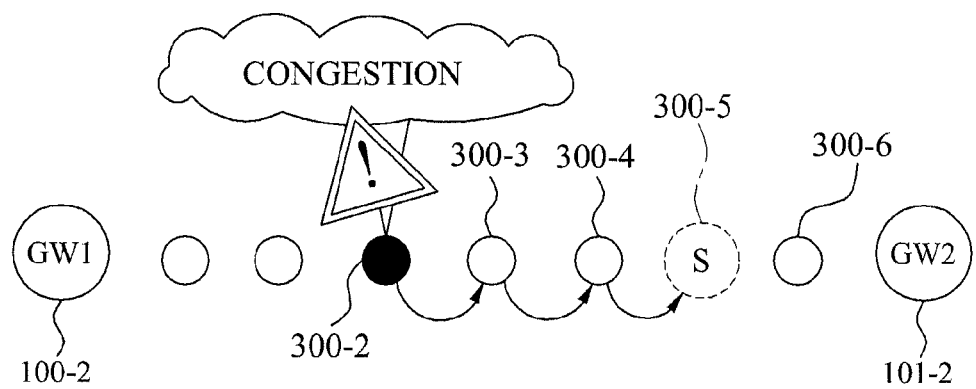
FIG. 6 is a diagram illustrating an on-demand congestion situation notice method for notifying about and avoiding congestion situation in data transmission according to an embodiment of the present invention.

FIG. 6 illustrates an on-demand congestion situation notice method for notifying about and avoiding a congestion situation in data transmission according to an embodiment of the present invention.

Referring to FIG. 6, a mesh node 300-2 existing in a route between a GW 100-2 and a GW 101-2 may calculate the data congestion level with respect to the corresponding queues of the mesh node 300-2, and may determine whether the data congestion level is greater than or equal to a predetermined value.

When the data congestion level is greater than or equal to the predetermined level, the mesh node 300-2 may set the data congestion level in the CCL field 210, and may generate an RANN message including the CF field 200 set to 1, and may transmit the generated RANN message to a subsequent mesh node 300-3 of the same route. Accordingly, a subsequent mesh node 300-3 and further subsequent mesh nodes 300-4 to 300-6 may determine route congestion level of the RANN message transmitted from the mesh node 300-2, and may differentially transmit data.

Similar to the previous congestion situation notice method, each of the subsequent mesh node 300-3 and the further subsequent mesh nodes 300-4 through 300-6 may compare the corresponding data congestion level with the route congestion level of a received RANN message, and may set, in the RANN message, the data congestion level as the route congestion level when the data congestion level is greater than the route congestion level.

Figure 7:
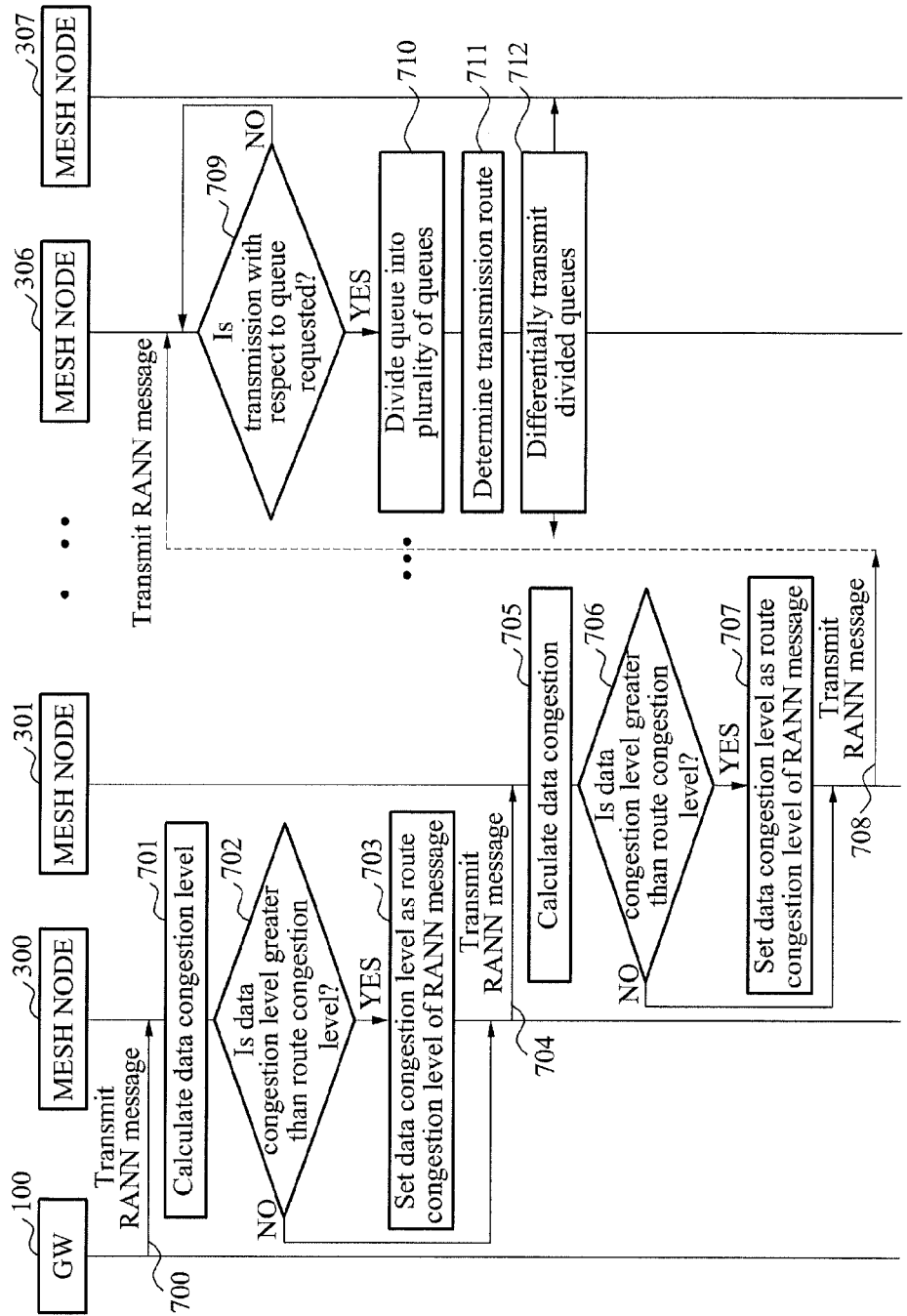
FIG. 7 is a diagram illustrating the method of proactively notifying about congestion situation in data transmission according to another embodiment of the present invention.

FIG. 7 illustrates a method of previously notifying about a congestion situation in data transmission according to another embodiment of the present invention. Referring to FIG. 7, a previous congestion situation notice method and a method of differentially transmitting data may be used.

Referring to FIG. 7, the GW 100 may generate an RANN message and may transmit the generated RANN message to the mesh node 300 existing in a route to another GW in operation 700. In this example, a route congestion level having an initial value may be set in the generated RANN message.

In operation 701, a data congestion level may be calculated based on a degree of data accumulated in a queue of the mesh node 300.

In this example, when processing of a queue having a high priority is further delayed, the data congestion level may be determined to be higher based on priority information of each of multiple queues and the degree of data accumulated in each of the multiple queues.

In operation 702, whether the calculated data congestion level of operation 701 is greater than the route congestion level of the RANN message may be determined, and when the calculated data congestion level is greater than the route congestion level, the data congestion level is newly set in the RANN message as the route congestion level in operation 703.

In operation 704, the received RANN message or the RANN message where the route congestion is newly set may be transmitted to a subsequent mesh node 301. In operation 704, the RANN message where the route congestion level is newly set may be transmitted to the subsequent mesh node 301 when the route congestion level is newly set in the RANN message in operation 703 or the received RANN message may be transmitted to the subsequent mesh node 301 when the route congestion level is not newly set in the RANN message in operation 703.

The mesh node 301 and different mesh nodes of a subsequent route may repeat the described operations 701 through 704. When an RANN message is received by the mesh node 301 in operation 704, a data congestion level may be calculated based on a degree of data accumulated in a corresponding queue of the mesh node 301 in operation 705 in the same manner as operation 701. In operation 706, whether the data congestion level is greater than a route congestion level of the RANN message may be determined in the same manner as operation 703. When the data congestion level is greater than the route congestion level, the data congestion level is newly set as the route congestion level of the RANN message in operation 707 in the same manner as operation 703. In operation 708, the RANN message may be transmitted to the mesh node 301 of a subsequent route in the same manner as operation 704.

Accordingly, the greatest data congestion level of each location among mesh nodes existing in routes from the GW 100 to different GWs may be transmitted as the route congestion level of the corresponding route.

Subsequently, an operation where a mesh node, for example, mesh node 306, sequentially transmits data based on a route congestion level may be performed as follows.

When an RANN message is received in operation 708, whether data transmission with respect to a corresponding queue of a mesh node 406 is requested may be determined in operation 709.

When the data transmission is requested in operation 709, the queue may be divided into divided queues in operation 710.

In operation 711, a transmission route may be determined based on the route congestion level of the RANN message. In this example, the transmission route of the primary GW and the secondary GW may be determined with respect to each of the divided queues, based on the route congestion level of the RANN message.

A differential transmission level of the divided queues may be determined based on airtime link cost information of each of the primary GW and the secondary GW and the route congestion level, and may determine the transmission route of the primary GW and the transmission route of the secondary GW with respect to each of the divided queues based on the differential transmission level.

In operation 712, the divided queues may be sequentially transmitted to the transmission routes determined in operation 711. Accordingly, each of the divided queues may be transmitted to a corresponding transmission route.

Figure 8:
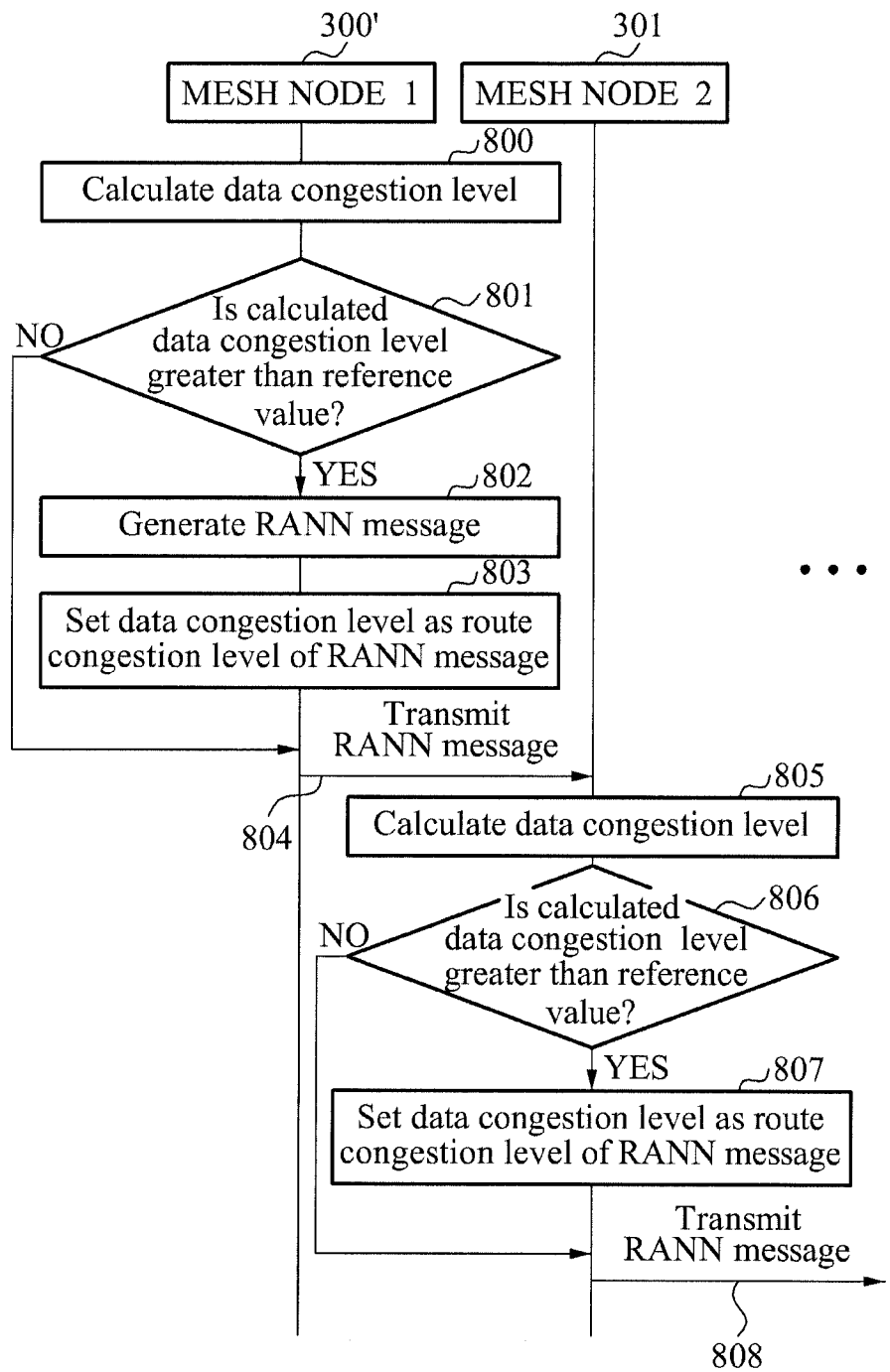
FIG. 8 is a diagram illustrating on-demand congestion situation notice method in data transmission according to another embodiment of the present invention.

FIG. 8 illustrates the on-demand congestion situation notice method in data transmission according to another embodiment of the present invention.

In operation 800, mesh node (1) 300' calculates the data congestion level based on the degree of data accumulated in the queues to be used for transmitting the data.

In operation 801, whether data congestion level calculated in operation 800 is greater than or equal to a predetermined value may be determined.

When the data congestion level is greater than the predetermined value in operation 801, an RANN message may be generated in operation 802, and the data congestion level may be set as the route congestion level of the generated RANN message in operation 803.

In operation 804, the RANN message where the route congestion level is set in operation 803 may be transmitted to the mess node (1) 300' and a subsequent mesh node (2) 301 existing in the same route as the mesh node (1) 300'.

Subsequent operations 805 through 808 may be performed in the same manner as operations 705 through 708. Operations corresponding to operations 709 through 712 of FIG. 7 for sequentially transmitting data may be further performed.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of notifying about and avoiding congestion situation in data transmission using a mesh node existing in a route between multiple gateways (GWs) in a wireless mesh network, the method comprising:
   calculating the data congestion level based on the degree of data accumulated in the queues of a mesh node to be used for transmitting the data when a Route Announcement (RANN) message is received from the multiple GWs;
   comparing the route congestion level of the RANN message with the data congestion level;
   setting the data congestion level as the route congestion level of the RANN message when the data congestion level is greater than the route congestion level, and transmitting the RANN message where the route congestion level is newly set, to the mesh node and a subsequent mesh node in the same route as the mesh node; and
   transmitting divided queues obtained by dividing the queue, to transmission routes determined based on the route congestion level, when data transmission with respect to the queue is requested,
   wherein the transmitting comprises:
   dividing the multiple queues into divided queues; and
   differentially transmitting, based on the route congestion level of the RANN message, the divided queues to a transmission route of a primary GW and a transmission route of a secondary GW.

2. The method of claim 1, further comprising:
   transmitting divided queues obtained by dividing the queue, to transmission routes determined based on the route congestion level, when data transmission with respect to the queue is requested.

3. The method of claim 1, wherein the calculating comprises:
   determining, based on a degree of data accumulated in each of queues and priority information, the data congestion level to be higher when processing of a queue having a high priority is further delayed.

4. The method of claim 1, wherein the differentially transmitting comprises:
   determining a differential transmission level of the divided queues based on the route congestion level and airtime link cost information associated with each of the primary GW and the secondary GW; and
   transmitting, based on the determined differential transmission level, each of the divided queues to the transmission route of the primary GW and the secondary GW.

5. A method of notifying about and avoiding congestion situation in data transmission using a mesh node existing in a route between multiple gateways (GWs) in a wireless mesh network, the method comprising:
   calculating data congestion level based on the degree of data accumulated in the queues to be used for transmitting the data;
   generating an RANN message based on whether the calculated data congestion level is greater than or equal to a predetermined value, setting the calculated data congestion level as a route congestion level of the RANN message, and transmitting the RANN message where the calculated data congestion level is set as the route congestion level, to the mesh node and a subsequent mesh node in the same route as the mesh node
   receiving a different RANN message from outside the mesh node; and
   dividing the multiple queues into divided queues when data transmission with respect to the queue is requested, and transmitting each of the divided queues to transmission routes determined based on the route congestion level of the different RANN message.

6. The method of claim 5, wherein the calculating comprises:
   determining, based on the degree of data accumulated in each of multiple queues and priority information, the data congestion level to be higher when processing of a queue having a high priority is further delayed.

7. A method of notifying about and avoiding congestion situation in data transmission using a mesh node existing in a route between multiple gateways (GWs) in a wireless mesh network, the method comprising:
   calculating data congestion level based on the degree of data accumulated in the queues to be used for transmitting the data; and
   generating an RANN message based on whether the calculated data congestion level is greater than or equal to a predetermined value, setting the calculated data congestion level as a route congestion level of the RANN message, and transmitting the RANN message where the calculated data congestion level is set as the route congestion level, to the mesh node and a subsequent mesh node in the same route as the mesh node,
   wherein the transmitting comprises:
   dividing the queue into divided queues; and
   differentially transmitting the divided queues to a transmission route of a primary GW and a transmission route of a secondary GW, based on the route congestion level of the RANN message.

8. The method of claim 7, wherein the differentially transmitting comprises:
   determining a differential transmission level of the divided queues, based on the route congestion level and airtime link cost information associated with each of the primary GW and the secondary GW; and
   transmitting each of the divided queues to the transmission route of the primary GW and the transmission route of the secondary GW, based on the determined the differential transmission level.

9. A mesh node existing in a route between multiple gateways (GWs) in a wireless mesh network, the mesh node comprising:

a message receiving unit to receive an RANN message from the multiple GWs;
a calculator to calculate the data congestion level based on the degree of data accumulated in the queues to be used for transmitting the data;
comparing a route congestion level of the RANN message with the data congestion level, newly setting the data congestion level as the route congestion level of the RANN message when the data congestion level is greater than the route congestion level, and transmitting the RANN message where the data congestion level is newly set as the route congestion level, to a mesh node in a subsequent route; and
a differential transmitting unit to divide the multiple queues into divided queues when data transmission with respect to the queue is requested, and to differentially transmit the divided queues to transmission routes determined based on the route congestion level,
wherein the differential transmitting unit divides the multiple queues into divided queues, and differentially transmits the divided queues to a transmission route of a primary GW and a transmission route of a differential GW based on the route congestion level of the RANN message.

10. The mesh node of claim 9, further comprising:
a differential transmitting unit to divide the multiple queues into divided queues when data transmission with respect to the queue is requested, and to differentially transmit the divided queues to transmission routes determined based on the route congestion level.

11. The mesh node of claim 9, wherein the calculator calculates, based on the degree of data accumulated in each of multiple queues and priority information, the data congestion level to be higher when a queue having a high priority is further delayed.

12. The mesh node of claim 9, wherein the differential transmitting unit determines a differential transmission level of the divided queues based on the route congestion level and airtime link cost information associated with each of the primary GW and the secondary GW.

13. A mesh node existing in a route between multiple GWs in a wireless mesh network, the mesh node comprising:
a calculator to calculate a data congestion level based on a degree of data accumulated in the queues to be used for transmitting the data;
a congestion determining unit to determine whether the calculated data congestion level is greater than or equal to a predetermined value;
a message transmitting unit to generate an RANN message for which the data congestion level is set as the route congestion level when the data congestion level is greater than or equal to the predetermined value, and to transmit the generated RANN message to a subsequent mesh node in the same route as the mesh node; and
a differential transmitting unit to divide the multiple queues into divided queues when data transmission with respect to the queue is requested, and to differentially transmit the divided queues to transmission routes determined based on a route congestion level of a different RANN message received from outside the mesh node.

14. The mesh node of claim 13, wherein the calculator calculates, based on the degree of data accumulated in each of multiple queues and priority information, the data congestion level to be higher when a queue having a high priority is further delayed.

15. A mesh node existing in a route between multiple GWs in a wireless mesh network, the mesh node comprising:
a calculator to calculate a data congestion level based on a degree of data accumulated in the queues to be used for transmitting the data;
a congestion determining unit to determine whether the calculated data congestion level is greater than or equal to a predetermined value; and
a message transmitting unit to generate an RANN message for which the data congestion level is set as the route congestion level when the data congestion level is greater than or equal to the predetermined value, and to transmit the generated RANN message to a subsequent mesh node in the same route as the mesh node,
wherein the differential transmitting unit divides the multiple queues into divided queues, and differentially transmits the divided queues to a transmission route of a primary GW and a transmission route of a secondary GW based on a route congestion level of the RANN message.

16. The mesh node of claim 15, wherein the differential transmitting unit determines a differential transmission level of the divided queues based on the route congestion level and airtime link cost information associated with each of the primary GW and the secondary GW, and transmits each of the divided queues to the transmission route of the primary GW and the transmission route of the secondary GW based on the determined differential transmission level.

* * * * *